Figure 1:
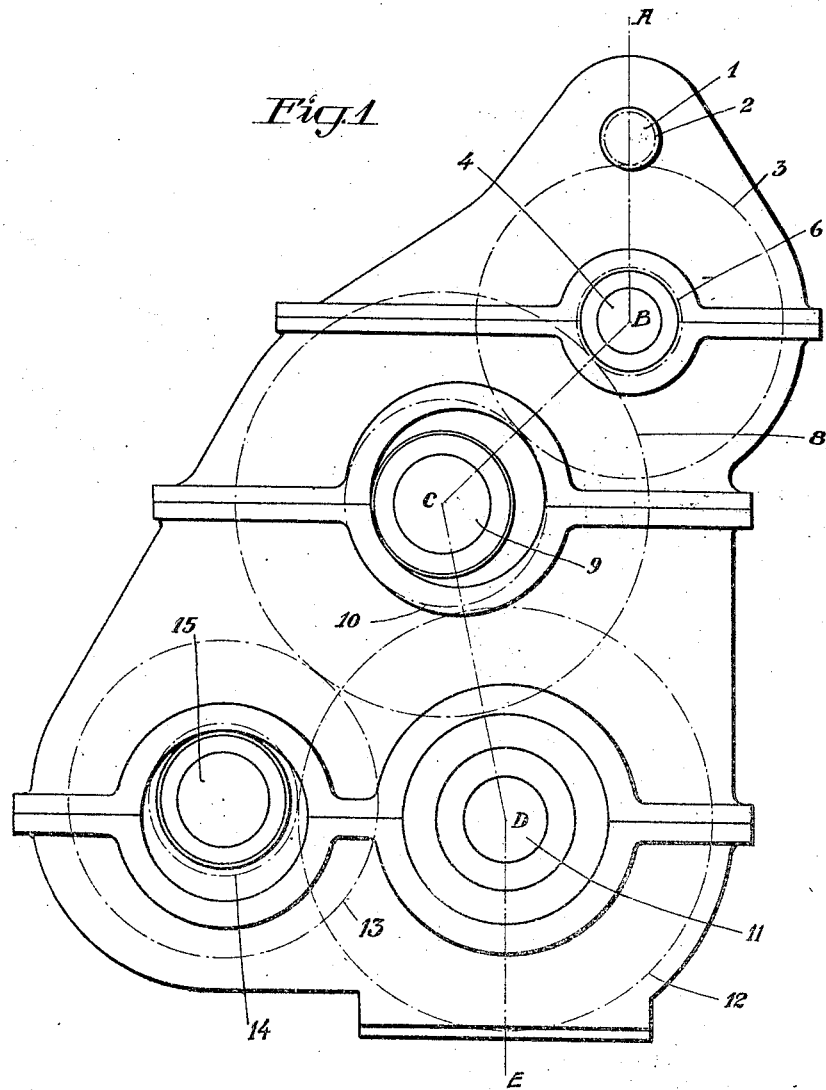

March 23, 1926.

F. LJUNGSTRÖM 1,577,532

TOOTHED GEARING FOR TURBINE LOCOMOTIVES

Filed June 16, 1923      2 Sheets-Sheet 1

Inventor
F. Ljungström,
By Marks Clerk
Attys.

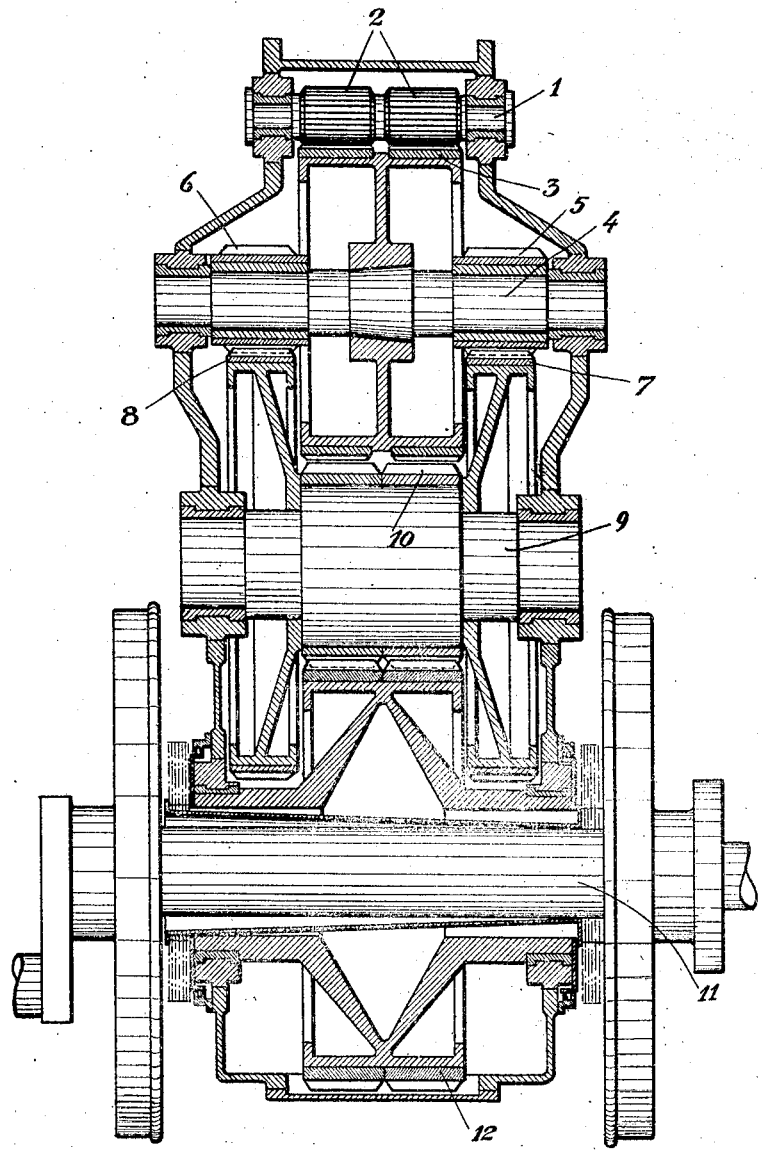

Patented Mar. 23, 1926.

1,577,532

UNITED STATES PATENT OFFICE.

FREDRIK LJUNGSTRÖM, OF BREVIK, LIDINGON, SWEDEN, ASSIGNOR TO AKTIEBOLAGET LJUNGSTRÖMS ÅNGTURBIN, OF STOCKHOLM, SWEDEN, A CORPORATION.

TOOTHED GEARING FOR TURBINE LOCOMOTIVES.

Application filed June 16, 1923. Serial No. 645,819.

*To all whom it may concern:*

Be it known that I, FREDRIK LJUNGSTRÖM, a subject of the King of Sweden, residing at Brevik, Lidingon, Sweden, have invented certain new and useful Improvements in Toothed Gearings for Turbine Locomotives, of which the following is a specification.

In turbine driven locomotives it has been previously suggested to transmit the driving power from the turbine to the driving shafts by means of a toothed gearing and a lay shaft connected thereto which lay shaft carries the last wheel of the gearing and from which shaft the movement is transmitted to the driving wheels by means of coupling rods. It has also been suggested in such a toothed gearing to effect the reversing of the direction of movement by providing a reversing gear in temporary connection with the gears of the gearing, which reversing gear when in function meshes with two gears of the gearing but is otherwise out of mesh with said gears. In forward running said last-mentioned gears mesh with each other, but when backward running is to be effected, the one gear is moved at first out of mesh with the second gear and then the reversing gear is moved to mesh with both said gears as stated before. The gear movable in this way has been mounted on the lay shaft, which has been movably mounted about a pivot. Further it has been suggested to transmit the driving power from the turbine to the driving shafts by means of a toothed gearing, the last and most slowly rotating gear of which is mounted directly on a driving shaft, the gearing thus not containing any lay shaft connected to the driving wheels by means of coupling rods. In such an arrangement it has been suggested at last to effect the movement of the gears into and out of mesh with each other by the corresponding shafts being radially adjustable parallelly to themselves. In this case the gear movable in the manner described has been the first gear of the gearing in mesh with the pinion on the turbine shaft.

This invention relates to an arrangement in gearings between turbine and driving wheels in turbine driven locomotives and the like, said gearings being provided with a reversing gear, adapted to be moved into and out of mesh with gears mounted on two separate shafts, the one gear of which being adapted to be moved out of mesh with the other by the shaft of the first mentioned gear being radially movable parallelly to itself for instance by means of an eccentric device.

The invention consists in the gear, the shaft of which is movable in the manner mentioned above, being an intermediate gear of the gearing. In order that the movement for bringing said intermediate gear into and out of mesh be effected as freely as possible the gear is conveniently so arranged in relation to the gear with which the intermediate gear meshes or can mesh that the centre of the intermediate shaft lies outside the straight line connecting the centres of the two other gears.

An embodiment of a gearing arranged according to the invention is illustrated in the accompanying drawings, in which Fig. 1 shows a side view of the housing enclosing the gearing and Fig. 2 is a section on the broken line A—B—C—D—E in Fig. 1.

1 designates a shaft connected to the turbine (not shown) and provided with a double pinion 2, meshing with a greater gear 3. On the shaft 4 carrying the gear 3 are mounted two pinions 5 and 6, each meshing with a gear 7 and 8 respectively, forming intermediate gears of the gearing and carried by a shaft 9 close to the ends thereof. Mounted on the shaft 9 is also a pinion 10, movable into and out of mesh with a gear 12 mounted on the driving shaft 11. The shaft 9 is radially adjustable parallelly to itself by means of an eccentric device not nearer shown. By means of a similar eccentric device reversing gears 13 and 14 mounted on a common shaft 15 can also be moved into and out of mesh with the gears 7, 8 and 12 respectively in order to effect or break off backward running. In forward running the gear 10 meshes with the gear 12, whereas the reversing gears 13 and 14 are out of mesh. When backward running is to be effected, the gear 10 is moved out of mesh with the gear 12 and then the gears 13 and 14 are moved into mesh with the gears 7, 8 and 12 respectively.

The shaft 9 carrying the gears 7, 8 and 10 is so mounted and so influenced by the corresponding eccentric device, that, when by means thereof the gear 10 is moved out of mesh with the gear 12, the centre of the shaft 9 is swung along an arc having its centre in the centre of the shaft. As will be seen from Fig. 1 the shaft 9 is so arranged, that its centre lies outside the straight line connecting the centres of the shafts 4 and 11, carrying the gears 3, 5, 6 and 12 respectively, with which the gears 7, 8 and 10 respectively mounted on the shaft 9 are or can be brought into and out of mesh. Thus the coupling of the gears 10 and 12 and the disconnection thereof is easier effected with reference to the position of the teeth and tooth spaces of the two gears, than if the shaft 9 were located in or close to the line connecting the centres of the shafts 4 and 11.

What I claim as new and desire to secure by Letters Patent of the United States of America is:—

1. In turbine driven locomotives and similar vehicles, a gearing between the turbine and the driving wheels, comprising a driving shaft, a gear mounted on said shaft, an intermediate shaft, two gears of different sizes mounted on said intermediate shaft, the larger of which gears meshes with the gear of the driving shaft, a driven shaft, a gear mounted on said driven shaft, a reversing shaft, a gear mounted on said reversing shaft, and means to move radially the intermediate shaft and the reversing shaft so that the larger gear carried by the intermediate shaft may be brought into and out of engagement with the gear of the reversing shaft, whilst the smaller gear of said intermediate shaft may be brought into and out of engagement with the gear of the driven shaft and the gear of the reversing shaft into and out of engagement with the gear of the driven shaft.

2. In turbine driven locomotives and similar vehicles, a gearing between the turbine and the driving wheels, comprising a driving shaft, a gear mounted on said shaft, an intermediate shaft, two gears of different sizes mounted on said intermediate shaft, the larger of which meshes with the gear of the driving shaft, a second intermediate shaft, two gears of different sizes mounted on said second intermediate shaft, the larger of which meshes with the smallest gear of the first intermediate shaft, a driven shaft, a gear mounted on said shaft, a reversing shaft, two gears mounted on said shaft, and means for radially moving the second intermediate shaft and the reversing shaft so that on forward running the smallest gear of the second intermediate shaft may be brought into engagement with the gear of the driven shaft, the gears of the reversing shaft then being out of engagement and on backward running the said engagement may be broken and the two gears of the reversing shaft may be brought into engagement with the larger gear of the second intermediate shaft and the gear of the driven shaft respectively.

3. In turbine driven locomotives and similar vehicles, a gearing between the turbine and the driving wheels, comprising a driving shaft, a gear mounted on said shaft, an intermediate shaft, two gears of different sizes mounted on said intermediate shaft, the larger of which gears meshes with the gear of the driving shaft, a driven shaft, a gear mounted on said driven shaft, a reversing shaft, a gear mounted on said reversing shaft, and means to move radially the intermediate shaft and the reversing shaft so that the larger gear carried by the intermediate shaft may be brought into and out of engagement with the gear of the reversing shaft, whilst the smaller gear of said intermediate shaft may be brought into and out of engagement with the gear of the driven shaft and the gear of the reversing shaft into and out of engagement with the gear of the driven shaft, the center of the intermediate shaft lying outside the line connecting the center of the driving shaft and that of the driven shaft.

4. In a turbine driven locomotive and similar vehicles, a gearing between the turbine and the driving wheels, comprising a driving shaft, a gear mounted on said shaft, an intermediate shaft, two gears of different sizes mounted on said intermediate shaft, the larger of which gear meshes with the gear of the driving shaft, a driven shaft, a gear mounted on said driven shaft, a reversing shaft, two gears of different sizes mounted on said reversing shaft, and means to move radially the intermediate shaft and the reversing shaft so that the larger gear carried by the intermediate shaft may be brought into and out of engagement with the larger gear of the reversing shaft, whilst the smaller gear of said intermediate shaft may be brought into and out of engagement with the gear of the driven shaft and the smaller gear of the reversing shaft into and out of engagement with the gear of the driven shaft.

In testimony whereof I affix my signature.

FREDRIK LJUNGSTRÖM.